(12) United States Patent
Zhou et al.

(10) Patent No.: US 11,932,774 B2
(45) Date of Patent: Mar. 19, 2024

(54) WATERBORNE ISOCYANATE-FREE POLYURETHANE EPOXY HYBRID COATINGS

(71) Applicants: Qixin Zhou, Cuyahoga Falls, OH (US); Cheng Zhang, Akron, OH (US)

(72) Inventors: Qixin Zhou, Cuyahoga Falls, OH (US); Cheng Zhang, Akron, OH (US)

(73) Assignee: The University of Akron, Akron, OH (US)

( * ) Notice: Subject to any disclaimer, the term of this patent is extended or adjusted under 35 U.S.C. 154(b) by 173 days.

(21) Appl. No.: 16/940,488

(22) Filed: Jul. 28, 2020

(65) Prior Publication Data

US 2021/0032495 A1 Feb. 4, 2021

Related U.S. Application Data

(60) Provisional application No. 62/879,784, filed on Jul. 29, 2019.

(51) Int. Cl.
 C09D 175/12 (2006.01)
 C08G 71/04 (2006.01)
(52) U.S. Cl.
 CPC ........... C09D 175/12 (2013.01); C08G 71/04 (2013.01)
(58) Field of Classification Search
 CPC ................................ C09D 175/12; C08G 71/04
 See application file for complete search history.

(56) References Cited

U.S. PATENT DOCUMENTS

| | | | |
|---|---|---|---|
| 4,544,725 A | 10/1985 | Priola et al. | |
| 6,120,905 A | 9/2000 | Figovsky | |
| 7,232,877 B2 | 6/2007 | Figovsky et al. | |
| 7,820,779 B2 | 10/2010 | Birukov et al. | |
| 7,989,553 B2 | 8/2011 | Birukov et al. | |
| 9,102,829 B2 | 8/2015 | Birukov et al. | |
| 2014/0378648 A1 | 12/2014 | Soules et al. | |
| 2021/0009781 A1* | 1/2021 | Speer | C08J 9/144 |

FOREIGN PATENT DOCUMENTS

| | | | |
|---|---|---|---|
| CN | 101775137 B | * | 6/2012 |
| WO | 2005016993 A1 | | 2/2005 |
| WO | 2007062812 A1 | | 6/2007 |

OTHER PUBLICATIONS

English translation of CN-101775137.*
Figovsky et al. "Progress in elaboration of nonisocyanate polyurethanes based on cyclic carbonates" International Letters of Chemistry, Physics and Astronomy 3 (2012) 52-66. (Year: 2012).*
Waterborne isocyanate-free polyurethane epoxy hybrid coatings synthesized from sustainable fatty acid diamine; Green Chemistry, 2020, Cheng Zhang et al.

* cited by examiner

Primary Examiner — Robert S Walters, Jr.
(74) Attorney, Agent, or Firm — Renner, Kenner, Greive, Bobak, Taylor & Weber (57) ABSTRACT

A method for preparing waterborne non-isocyanate polyurethane polymers is provided, and the compositions prepared thereby. A method for preparing waterborne non-isocyanate polyurethane epoxy hybrid coatings is also provided. In addition to coatings, the compositions of the present invention are useful as films, adhesives, and sealants.

12 Claims, 4 Drawing Sheets
(4 of 4 Drawing Sheet(s) Filed in Color)

WATERBORNE ISOCYANATE-FREE POLYURETHANE EPOXY HYBRID COATINGS

CROSS-REFERENCE TO RELATED APPLICATION

This application claims priority from U.S. provisional patent application Ser. No. 62/879,784 filed on Jul. 29, 2019, which is incorporated herein by reference in its entirety.

FIELD OF THE INVENTION

One or more embodiments of the invention provide methods for preparing waterborne non-isocyanate polyurethane epoxy hybrid coatings, and the compositions prepared thereby. In addition to coatings, the compositions of the present invention are useful as films, adhesives, and sealants.

BACKGROUND OF THE INVENTION

Due to environmental protection pressure, waterborne isocyanate-based polyurethane coatings have gained rapid development in recent years. Additionally, the coatings industry is increasingly aware of the need to protect the environment and is constantly striving to ensure the safety of the industry and the health of consumers.

Conventional polyurethanes are synthesized from di- or tri-isocyanates and polyols through the step-growth polymerization of isocyanate groups and hydroxyl groups. However, isocyanates are known to cause many serious health issues. Additionally, the phosgene, the main raw material to produce isocyanate, is also a highly virulent chemical towards the environment and human health. Moreover, isocyanates can react with water moisture in air leading to deterioration which increases the difficulty and cost during production, storage, and transportation.

Several alternate "green" synthetic routes for polyurethane have been developed, such as the transurethanization method and the cyclic carbonate/amine reaction method. In these methods, polyurethanes are not synthesized from isocyanates, so the products are named as non-isocyanate polyurethane (NIPU) or isocyanate-free polyurethane. No hazardous isocyanates and phosgene are required during the polyurethane production process. NIPU polymers are further discussed in U.S. Pat. No. 7,232,877, which is incorporated herein by reference.

One of the most promising methods to prepare NIPU is synthesizing polyurethane through the polymerization of the cyclic carbonates and the amines. One of the major advantages of this method is that most of the cyclic carbonates and the amines used in producing NIPU are safer than isocyanates, which reduces the special handling requirements due to the safety issues.

Waterborne NIPU has been prepared by dispersing NIPU prepolymer into water through neutralizing the incorporated internal dispersion monomer (IDM) on the NIPU prepolymer chain. For example, a series of anionic waterborne non-isocyanate polyurea have been synthesized by introducing ethylenediaminetetraacetic dianhydride and 3,3'-diamino-N-methyldipropylamine as the IDM to neutralize and extend the polymer chain. This work illustrated that the synthesized waterborne polyurea was stable and the particle size could be changed by adjusting the amount of the IDM. However, the polyurethanes in this study were synthesized from a transurethanization method that usually required high reaction temperature (around 150° C.). The relatively low reactivity of the cyclic carbonate/amine reaction means that high reaction temperatures and long reaction times are required to synthesize the NIPU. This in turn means it will take a long time to cure NIPU on the object.

To accelerate the curing process of the NIPU, researchers have used an epoxy group as a 'bridge' to prepare solvent-based, ambient-curable NIPU. However, these hybrid coatings were still organic solvent-borne.

Hence, it would be desirable to have a method for preparing waterborne non-isocyanate polyurethane epoxy hybrid coatings while overcoming the drawbacks mentioned above.

SUMMARY OF THE INVENTION

One or more embodiments of the present invention provide a method to prepare environmental-friendly waterborne epoxy modified non-isocyanate polyurethanes.

One or more embodiments of the present invention further provide a method for preparing a waterborne amine-terminated non-isocyanate polyurethane polymer, the method comprising preparing an amine-terminated non-isocyanate polyurethane prepolymer by reacting a cyclic carbonate component, a tertiary amine functional component, and, optionally, a primary amine functional component, to form an amine-terminated non-isocyanate polyurethane prepolymer; neutralizing the prepolymer; and dispersing the neutralized prepolymer in water to form a waterborne amine-terminated non-isocyanate polyurethane.

One or more embodiments of the present invention further provide a method for preparing waterborne non-isocyanate polyurethane epoxy hybrid coating composition, the method comprising combining a waterborne non-isocyanate amine-terminated polyurethane polymer and a waterborne epoxy chain extender to form a waterborne non-isocyanate polyurethane epoxy hybrid coating composition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF ILLUSTRATIVE EMBODIMENTS

One or more embodiments of this invention is based upon the discovery of an effective method for preparing waterborne non-isocyanate amine-terminated polyurethane. One or more further embodiments of this invention is based upon the discovery of an effective method for preparing waterborne non-isocyanate polyurethane epoxy hybrid coatings.

Synthesis of Waterborne Amine-Terminated NIPU

In one or more embodiments, the waterborne amine-terminated NIPU may be prepared by a method that com- prises the steps of prepolymer synthesis, neutralization of the prepolymer, and dispersion.

Prepolymer Synthesis

The amine-terminated NIPU prepolymer may be prepared by reacting a cyclic carbonate component, a tertiary amine functional component, and optionally, a primary amine functional component, to form an amine-terminated NIPU. In one or more embodiments, the cyclic carbonate comprises at least two terminal five-member cyclic carbonate groups (also sometimes referred to as 1,3-dioxolan-2-one). The cyclic carbonate may be a dimer or oligomer containing terminal cyclocarbonate groups. Examples of cyclic carbonates include diglycerol dicarbonate (DGDC). Cyclic carbonates are further described in U.S. Pat. No. 6,120,905, which is incorporated herein by reference.

In one or more embodiments, the DGDC may be prepared from diglycerol and an excess amount of dimethyl carbonate at elevated temperature with a catalyst such as sodium methoxide. The synthesis of DGDC and the synthesis of a waterborne amine-terminated NIPU prepolymer is shown schematically in Scheme 1.

Scheme 1. The synthesis procedures of (a) DGDC; (b) waterborne amine-terminated NIPU prepolymers.

Amine-terminated NIPU dispersions

Fatty acid diamines

In one or more embodiments, the tertiary amine functional compound includes at least one tertiary amine group and contains at least two terminal primary amine groups. In one or more embodiments, the tertiary amine is 3,3'-diamino-N-methyldipropylamine (DMDPA) or tris-(2-aminoethyl) amine. In one or more embodiments, the tertiary amine functions as an IDM.

In one or more embodiments, the primary amine functional component is a polyamines with at least two terminal primary amine groups. Examples include fatty acid diamine (FDA), diethyl enetriamine, triethylenetetramine, tetraethylenepentamine, pentaethylenehexamine, propylenediamine, dipropylenetriamine, 2,4,4-trimethylhexamethylenediamine, 3,3'-diamino-N-methyldipropylamine, 1,4-bis-(3'-aminopropyl)-piperazine, N,N-bis-(3-aminopropyl)-ethylenediamine, neopentanediamine, 2-methyl-1,5-pentanediamine, 1,3-diaminopentane, hexamethylenediamine. In one or more embodiments, the primary amine functional component is a fatty acid diamine. In one or more embodiments, the fatty acid diamine may be a dimer diamine such as those available from Croda under the tradename Priamine 1075-LQ-(GD). Examples of primary amines are further described in U.S. Pat. Nos. 7,820,779 and 9,102,829, both of which are incorporated by reference herein.

In one or more embodiments, the molar ratio of amine groups and cyclic carbonate groups may be about 1 to about 2. In one or more embodiments, the mass percentage of tertiary amine may be from about 4 to about 24%, based upon the total weight of the reactive components, namely, the cyclic carbonate component, tertiary amine functional component, and primary amine functional component.

In one or more embodiments, the amine-terminated NIPU prepolymer may be represented by the formula:

—NH—R—NHCOO—CH(CH$_2$OH)—CH$_2$OCH$_2$CH(OH)—CH$_2$OOC—NH—(CH$_2$)$_3$—N(CH$_3$)—(CH$_2$)—NH— where R is a divalent organic group, and where an integer from 1 to about 34. In one or more embodiments, R is a divalent organic group having from 1 to about 20 carbon atoms.

Neutralization

In one or more embodiments, the amine-terminated NIPU may be neutralized by dissolving the polymer in a solvent and adding an acid in a sufficient amount to neutralize the tertiary amine group. In one or more embodiments, the step of dissolving and neutralizing is done at about room temperature.

Dispersion

In one or more embodiments, water may be added to the methanol solution of the neutralized amine-terminated NIPU to disperse the polymer in water and form a waterborne amine-terminated NIPU. In one or more embodiments, the step of dispersion is done by slowly adding water with vigorous stirring. The residual methanol may be removed, for example by using a rotary evaporator. In one or more embodiments, the solids content of the waterborne amine-terminated NIPU liquid dispersion can be selected and adjusted based upon amount of water added.

Synthesis of Waterborne Epoxy Chain Extender

In one or more embodiments, the waterborne epoxy chain extender may be prepared by combining an epoxide monomer and an amine. In one or more embodiments, a diamine is used. In one or more embodiments, the epoxide monomer is trimethylolpropane triglycidyl ether (TTE). In one or more embodiments, the diamine is diethanolamine.

Synthesis of Waterborne NIPU Epoxy Hybrid Coating Composition

In one or more embodiments, the waterborne NIPU epoxy hybrid coating composition may be prepared by combining the waterborne amine-terminated NIPU and the waterborne epoxy chain extender. In one or more embodiments, the step of mixing may be done at room temperature, with mixing.

Formation of the Coating

In one or more embodiments, the coating composition may be cast onto a substrate to form a wet film, and then the film may be cured to form a coating. In one or more embodiments, the wet film may be thermally cured, and in other embodiments, the wet film may be cured at about room temperature as the film dries (air drying).

In one or more embodiments, the coating composition may be cast onto a substrate to form a wet film having a thickness of from about 50 to about 200 micrometers (μm).

As the wet film of the coating composition cures, a solid coating is formed. In one or more embodiments, the wet film may be thermally cured, for example, at a temperature of about 100° C.

In one or more embodiments, the thickness of the cured coating is from about 20 to about 100 μm, in other embodiments, from about 30 to about 50 μm.

Advantages

Polyurethanes synthesized by the method of the present invention contain urethane groups on the backbone and primary or secondary hydroxyl groups on side chains that can be modified to incorporate other functional groups. In addition, the amines that may be utilized in this method include commonly used chemicals with many available structures. The cyclic carbonates can also be easily synthesized from many available pathways, for instance, some of the renewably sourced materials (i.e. epoxidized soybean oil, epoxidized cardanol) can be easily converted to cyclic carbonates for the synthesis of NIPU, which means the producing of bio-based NIPU from renewable sources is possible.

Compositions prepared by the method of the present invention may be used in forming films, paints, lacquers, varnishes, coatings, impregnates, sealants and adhesives for both natural and synthetic materials, such as textiles, wood, plastics, metal, and leather, as binders for non-woven fabrics, and in a wide variety of other uses.

In order to demonstrate the practice of the present invention, the following examples have been prepared and tested. The examples should not, however, be viewed as limiting the scope of the invention. The claims will serve to define the invention.

Examples

Generally, three types of waterborne NIPU epoxy hybrid coatings with biobased content from 27 to 68 wt. % were synthesized from TTE, diethanolamine, DGDC, DMDPA, and FDA. The formulation details are represented in Table 1 and Table 2. The sample (NIPU-1) synthesized without FDA was used as the control for comparison. The other samples were prepared from the same raw materials with the increasing amount of FDA. The chemical structure of reactants was characterized by FTIR and NMR. After dispersion, DLS was used to determine the particle size and its distribution. The thermal stability and glass transition temperature (Tg) were assessed by TGA and DSC, respectively. Tensile strength, Young's modulus, and elongation-at-break were investigated by tensile tests.

TABLE 1

The composition details of amine-terminated NIPU prepolymer.

| | Molar ratio | | | |
| --- | --- | --- | --- | --- |
| | DGDC | DMDPA | FDA | AHEW* |
| Prepolymer-1 | 1 | 1.2 | — | 221 |
| Prepolymer-2 | 1 | 0.6 | 0.6 | 415 |
| Prepolymer-3 | 1 | 0.3 | 0.9 | 649 |

*amine hydrogen equivalent weight

TABLE 2

The formulation details of waterborne NIPU epoxy hybrid coatings (wt. %).

| | Amine-terminated NIPU prepolymer | | | | Hard seg-ment [a] | Epoxy chain ex-tender | Bio-based con-tent [b] |
| --- | --- | --- | --- | --- | --- | --- | --- |
| | Total | DGDC | DMDPA | FDA | | | |
| NIPU-1 | 50.5 | 27.4 | 23.1 | 0 | 50.5 | 49.5 | 27.4 |
| NIPU-2 | 65.7 | 22.1 | 9.3 | 34.3 | 31.4 | 34.3 | 54.4 |
| NIPU-3 | 76.4 | 21.5 | 4.6 | 50.3 | 26.1 | 23.6 | 68.8 |

[a] The hard segment content = weight of (DGDC + DMDPA)/total weight.
[b] The biobased content = biobased weight of (DGDC + FDA)/total weight.

DGDC was synthesized from diglycerol and dimethyl carbonate with the presence of sodium methoxide as the catalyst. Advantageously, the raw materials for the synthesis of DGDC—diglycerol, and dimethyl carbonate—can derived from bio-based monomers. Thus, DGDC is a type of renewable cyclic carbonate that can be used to replace petroleum-based cyclic carbonates for sustainable development.

Formation of Amine-Terminated NIPU Prepolymers

Figure 1:
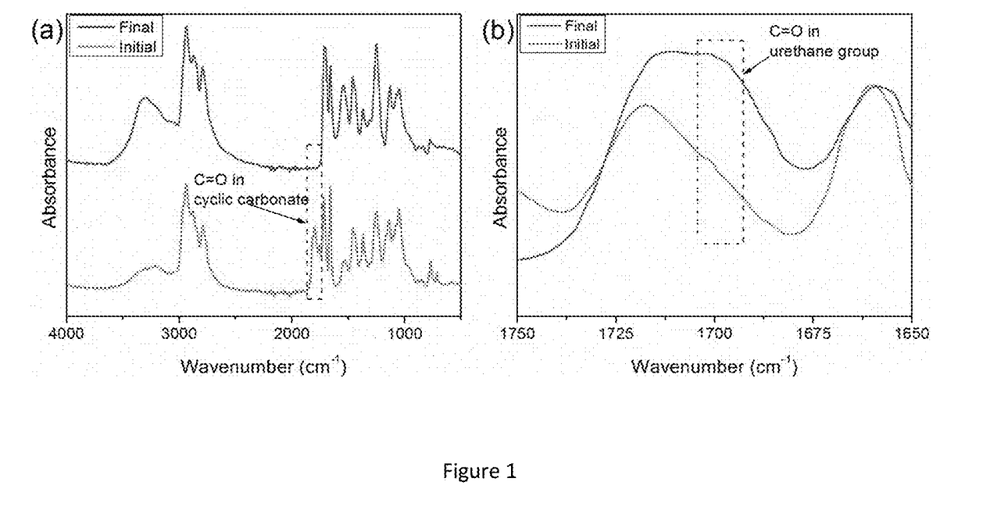
FIG. 1 is a FTIR spectra of an NIPU prepolymer at the initial reaction stage and final reaction stage: (a) full range; (b) in the range of 1750-1650 $cm^{-1}$.

The waterborne amine-terminated NIPU was synthesized through three steps: prepolymer synthesis, neutralization, and dispersion. The molar ratio of amine groups and cyclic carbonate groups was 1.2 for all formulations, and the molar ratio of DMDPA/FDA was designed as 1.2/0, 0.6/0.6, and 0.3/0.9. Firstly, the amine-terminated NIPU prepolymers were synthesized from amines and cyclic carbonates at 100° C. in a three-neck round bottom reaction flask with magnetic stirring under $N_2$ atmosphere for 8 hours. The chemical structure of NIPU prepolymer was characterized by FTIR, as shown in FIG. 1. Then, the amine-terminated NIPU prepolymers were dissolved in methanol (50 wt. %) at room temperature followed by adding enough amount of acetic acid to neutralize the tertiary amine group from DMDPA in waterborne amine-terminated NIPU prepolymer for 1 hour. After that, a certain amount of deionized water was slowly added into the waterborne amine-terminated NIPU prepolymer mixtures which were then dispersed by the vigorous mechanical stirring (1500 rpm) for 3 hours. Finally, the residual methanol was removed by using rotary evaporator to obtain brown waterborne amine-terminated NIPU liquid dispersions with a solid content of around 20%.

Figure 2:
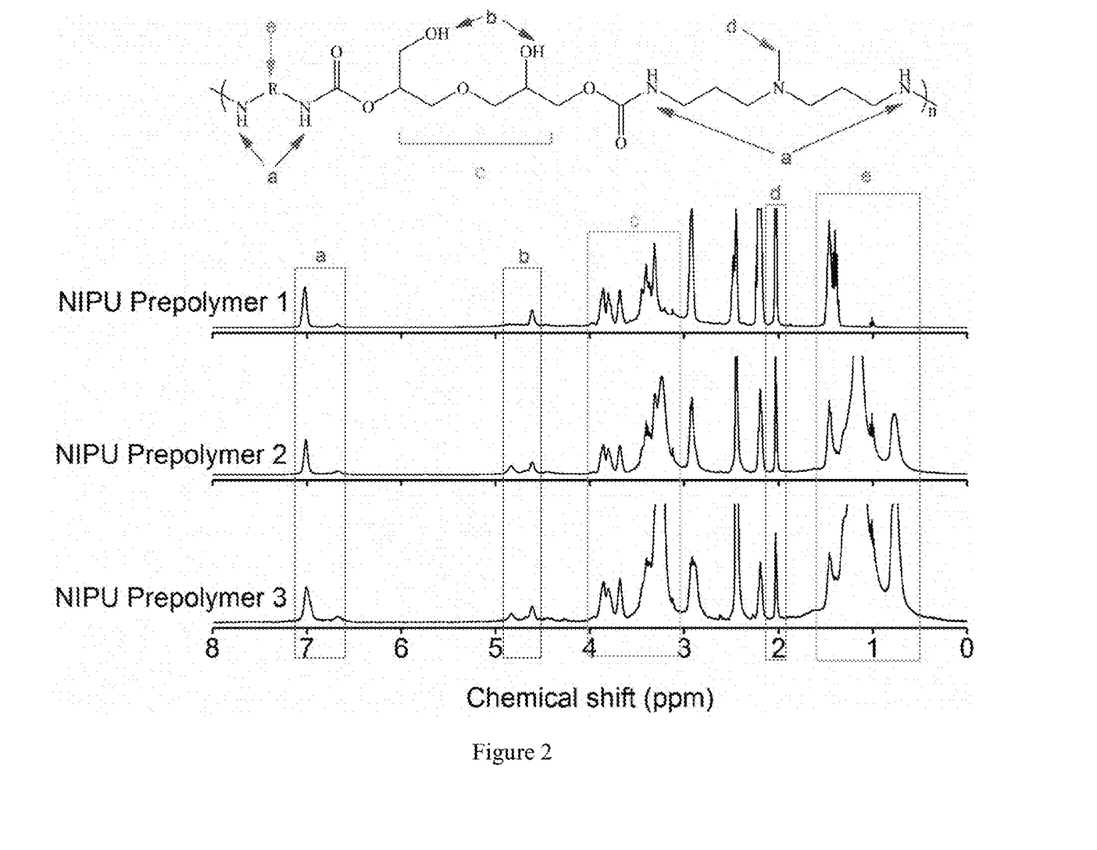
FIG. 2 shows a $^1H$ NMR spectra of amine-terminated NIPU prepolymers.

FTIR was used to monitor the chemical composition changes during the synthesis of amine-terminated NIPU prepolymer. FIG. 1 shows the FTIR spectra of the NIPU-1 prepolymer as an example at the initial and final reaction stage. All of the samples showed similar results. In this figure, both spectra curves showed similar signals in some regions: three absorption bands at 2936, 2876, and 2789 $cm^{-1}$, which were attributed to the C—H stretching of methyl (—$CH_3$) groups and methylene (—$CH_2$—) groups. However, two spectra curves showed significantly different signals in the following three regions: 3400-3000, 1797, and 1702 $cm^{-1}$. Firstly, the broad absorption band of O—H and N—H stretching (from amines) were observed in the region of 3400-3000 $cm^{-1}$. Compared with spectra of the initial stage, the signal in this region of the final stage became weaker and smoother which indicated the consumption of the amines groups by the amines/cyclic carbonate reaction. Although the signal became weaker in the final stage spectra, the absorption band of N—H stretching in amines group was still observed which illustrated that there was remaining amines group in the synthesized NIPU prepolymers. Secondly, a strong signal at 1797 cm$^{-1}$ on the initial stage, which is the absorption of C=O stretching in cyclic carbonate groups, completely disappeared on the final stage. The disappearance of this signal implied the cyclic carbonate groups were fully reacted during the reaction of amines/cyclic carbonate. Thirdly, a new signal with a high intensity was shown at 1702 cm$^{-1}$ in the curve of final reaction stage, which was assigned to the C=O stretching in the urethane groups synthesized from non-isocyanate routes. In addition, $^1$H NMR was also used to characterize the chemical structure of amine-terminated NIPU prepolymers, as shown in FIG. 2. The appearance of signals at 7.01 and 6.67 ppm were associated with the formation of urethane and the peak at 4.60-4.84 ppm indicated the hydroxyl group formed by the cyclic carbonate/amine reaction. In general, this appearance verified the formation of urethane bond which furtherly illustrated the amine-terminated non-isocyanate polyurethane prepolymer was successfully synthesized.

Synthesis of Waterborne Epoxy Chain Extender

The waterborne epoxy chain extender was synthesized from TTE and diethanolamine. TTE and diethanolamine were reacted with a molar ratio of 1:1. The TTE (30.1 g, 0.1 mol) was dissolved in acetone (20.0 mL) obtaining a TTE solution. A solution of diethanolamine was produced by mixing (10.4 g, 0.1 mol) and methanol (20.0 mL). The diethanolamine solution was added dropwise into the flask containing the TTE solution at room temperature. After addition, the reactants were stirred for 24 hours. Then, enough amount of acetic acid was added to the solution to neutralize the tertiary amine group from diethanolamine for 1 hour. After that, a certain amount of deionized water was slowly added into the epoxy chain extender mixtures which were then dispersed by the vigorous mechanical stirring (1500 rpm) for 3 hours. Finally, the residual methanol was removed by using rotary evaporator to obtain waterborne epoxy chain extender with a solid content of around 20%.

Figure 3:
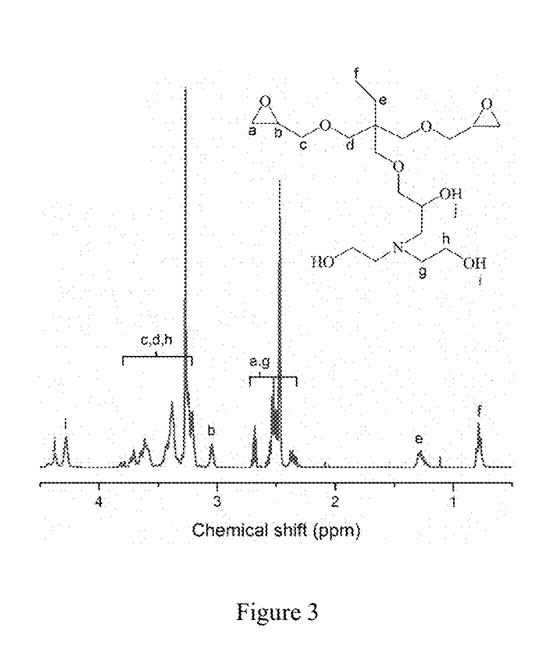
FIG. 3 shows a $^1H$ NMR spectra of a synthesized epoxy chain extender.

$^1$H NMR spectra verified the structure of synthesized epoxy chain extender, as illustrated in FIG. 3. The new proton resonance at δ=3.38 suggested the formation of a new secondary hydroxyl group (j) formed from the reaction of the epoxy group and amines group. Additionally, the existence proton resonances at 2.32-2.72 and 3.03 ppm represented the existence of remaining epoxy group in the structure of synthesized epoxy chain extender.

Preparation of Waterborne NIPU Epoxy Hybrid Coatings

The waterborne NIPU epoxy hybrid coating was prepared by mixing waterborne amine-terminated NIPU and waterborne epoxy chain extender based upon the formulation in Table 2. The AHEW was calculated according to ASTM D2074 based upon the primary amine value and the secondary amine value. Firstly, the waterborne amine-terminated NIPU and the waterborne epoxy chain extender were combined into the glass vial with vigorous mixing under magnetic stirring for around 5 min followed by 10 min standing to remove air bubbles. After all the bubbles have disappeared, the waterborne NIPU epoxy hybrid coating was applied onto the glass with the wet film thickness of 120 μm which was controlled by the drawdown bar. Then, the mechanically strong dry films were formed after 12 hours of water evaporation. The tack-free films were baked in an oven at 100° C. for 2 hours. Finally, the samples were placed at room temperature for 7 days under air to obtain the testable solid films with a dry film thickness of around 30 μm.

Coating Characterization

DSC was employed to determine the Tg of waterborne NIPU epoxy hybrid coating films. The DSC curves of waterborne NIPU films are demonstrated in FIG. 4 and the Tg are listed in Table 3. Only one Tg at 21 and 22° C. was inspected in the DSC trace of NIPU-1 and NIPU-2. Two Tg were clearly detected in the DSC curves of NIPU-3 (−2° C. and 26° C.). No evident signal of NIPU film melting was observed within this testing temperature range, which signified the structure of NIPU films was amorphous structure instead of crystalline structure.

Figure 4:
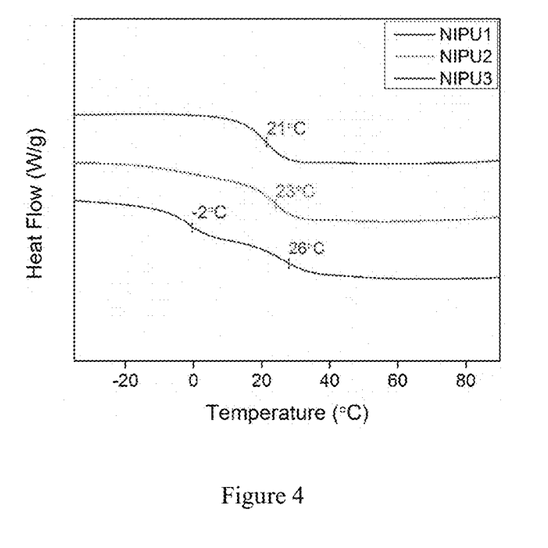
FIG. 4 shows DSC curves of three waterborne NIPU epoxy hybrid coating films of different compositions.

Polyurethanes usually present several glass transition stages that are related to the micro-phase separation of soft segment and hard segment, as depicted in Scheme 2. Usually, the soft segment often represents lower Tg due to the high flexibility while hard segment always exhibits higher Tg. The presence of only one Tg in the film NIPU-1 and NIPU-2 cleared showed that the micro-phases were well mixed in this film. The new Tg appearing at around −2° C. in films of NIPU-3 evidenced the micro-phase separation happened in the morphology of NIPU films.

Scheme 2. The hard segment and soft segment structure in waterborne NIPU films

Previous research has claimed that the micro-phase separation of soft segment and hard segment was dominated by H-bonding, which was related to the composition of polyurethane. Thus, it was considered that the morphological difference between these NIPU films was induced by the difference in the polymer composition. For NIPU-3 film, the increasing usage of flexible FDA increased the amount of soft segment, as described in Table 1, which would hinder the formation of the hard segment (urethane group) within the NIPU films. Hence, as increasing the soft segment, the amount of H-bonding was reduced from NIPU-1 to NIPU-3, and then the phenomenon of micro-phase separation became apparent. While for film NIPU-1, the amount of hard segment was the highest because no FDA (soft segment) was incorporated. Hence, only one Tg was displayed for film NIPU-1 since the micro-phase separation was restrained by the higher amount of H-bonding formed within the hard segment. The results of DSC verified the polyurethane synthesized from isocyanate-free method contained the similar soft and hard segment structure as the conventional isocyanate-based polyurethane.

Thermal Stability

TGA was applied to identify the thermal stability of waterborne NIPU films. The temperatures at which 10% and 20% of weight loss occurring are presented in Table 3. It was apparent that the weight loss of samples without the FDA (NIPU-1) was remarkably faster than that of the samples with the incorporation of the FDA (NIPU-2, 3). From the curve of NIPU-1, the sample started to decompose in the beginning (around 160° C.), which was then completely decomposed at approximately 400° C. As illustrated in NIPU-2 curve, the polyurethane chain was gradually decomposed at 200° C. and wholly decomposed at 500° C. The curve of NIPU-3 showed a similar trend as that of NIPU-2.

The thermal stability was strengthened with the incorporation of the FDA. As an example, NIPU-1 showed lowest $T_{10}$ at whereas $T_{10}$ of NIPU-3 was the highest among these samples. The positive effect of the FDA towards the thermal stability of waterborne NIPU epoxy hybrid coating films could be caused by the decreasing amount of urethane group in the NIPU structure formed by amine/cyclic carbonate reaction. The urethane bond was more likely to be the first to cleave during thermal degradation in this waterborne NIPU structure. Therefore, if the polymer contained a higher amount of urethane group, it is easier to decompose and form volatiles compounds in thermal degradation. The thermal stability of the waterborne NIPU epoxy hybrid coating films was comparable to isocyanate-based waterborne polyurethane.

TABLE 3

Thermal properties and mechanical properties of waterborne NIPU films (° C.).

| | DSC (° C.) | | TGA (° C.) | | Tensile test [a] | | |
|---|---|---|---|---|---|---|---|
| | $T_{g1}$ | $T_{g2}$ | $T_{10}$ | $T_{20}$ | E (MPa) | σ (MPa) | ε (%) |
| NIPU-1 | — | 21 | 160 | 224 | 9.3 ± 1.3 | 2.4 ± 0.4 | 26 ± 5 |
| NIPU-2 | — | 23 | 252 | 278 | 1.6 ± 0.3 | 1.7 ± 0.3 | 107 ± 19 |
| NIPU-3 | −2 | 26 | 252 | 287 | 0.4 ± 0.1 | 0.5 ± 0.1 | 134 ± 33 |

[a] E is Young's Modulus; σ is tensile strength, and ε is elongation-at-break.

Mechanical Properties

Tensile tests were applied to evaluate the mechanical properties of waterborne NIPU films including tensile strength, elongation-at-break, and Young's Modulus. Table 3 summarized the mechanical properties of waterborne NIPU films. The difference in mechanical properties is obvious from NIPU-1 to NIPU-3. The Young's Modulus decreased significantly from 9.3 MPa for NIPU-1 to 1.6 MPa for NIPU-2 then dropped down to 0.4 MPa for NIPU-3. The similar decreased trend was found on tensile strength, which decreased by 77% from NIPU-1 to NIPU-3. As predicted, the elongation-at-break showed a reversed trend with Young's Modulus and tensile strength. NIPU-1 only showed 26% elongation-at-break while that of NIPU-3 was around 134%. The changes of mechanical properties can be attributed to the increased amount of soft segment by the incorporation of the FDA. The NIPU-1 film showed a high strength and low flexibility feature because the polymer contained a high amount of hard segment. The hard segment formed by urethane connection would improve the Young's Modulus and tensile strength by providing more physical crosslinking through hydrogen bonding.

General Coating Properties

General coating properties were measured to evaluate the coating application performance, including solvent resistance, pendulum hardness, pencil hardness, and impact resistance, and the results are summarized in Table 4.

TABLE 4

General coating properties of waterborne NIPU coatings

|  | Solvent resistance | Pendulum hardness (s) | Pencil hardness | Impact resistance (kg/cm) |
|---|---|---|---|---|
| NIPU-1 | 100+ | 19 | B | 30 |
| NIPU-2 | 100+ | 14 | 2B | 80+ |
| NIPU-3 | 100+ | 14 | 2B | 80+ |
| Commercial coating | 100+ | 30 | H | 80+ |

All the coatings showed excellent solvent resistance, similar to commercial waterborne polyurethane coating. In addition, NIPU-1 showed higher pendulum hardness and pencil hardness than that of the FDA derived samples. Finally, the results of impact resistance revealed that the NIPU-2 and NIPU-3 have similar impact resistance to that of the commercial waterborne coating, while NIPU-1 exhibited lower impact resistance than the commercial waterborne coating.

The waterborne NIPU epoxy hybrid coating films with 50 wt. % of FDA showed a similar two-Tg phenomenon as conventional isocyanate-based PU, which was caused by the micro-phase separation due to using the large amount of FDA as a soft segment. In addition, the increasing amount of FDA as the soft segment also improved the thermal stability due to the decreasing amount of urethane group which is easier to be broken during thermal degradation. Finally, the NIPU-2 showed the best balance of the mechanical strength and elongation-at-break which revealed that the rigid NIPU could be tailored by introducing the FDA as a soft segment.

Advantageously, environmental-friendly waterborne NIPU epoxy hybrid coatings are provided that may be synthesized from renewable cyclic carbonate, FDA, amine-based IDM, and waterborne epoxy chain extender. The raw materials are not sensitive to water moisture, so it is easier to control the quality of NIPU compared to isocyanate-based polyurethanes during production. The successful synthesis of waterborne NIPU epoxy hybrid coatings with great performance would furtherly expand the potential application of environmental-friendly non-isocyanate polyurethanes.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A method for preparing waterborne non-isocyanate polyurethane epoxy hybrid coating composition, the method comprising:
   combining a waterborne non-isocyanate amine-terminated polyurethane polymer and a waterborne epoxy chain extender to form a waterborne non-isocyanate polyurethane epoxy hybrid coating composition; and
   wherein the waterborne epoxy chain extender comprises water prior to the step of combining.

2. The method of claim 1, wherein the waterborne chain extender is prepared by reacting an epoxide monomer and an amine.

3. The method of claim 2, wherein the amine is a diamine.

4. The method of claim 2, wherein the epoxide monomer is trimethyloylpropane triglycidyl ether.

5. The method of claim 1, wherein the waterborne amine-terminated non-isocyanate polyurethane polymer is prepared by a method comprising:
   preparing an amine-terminated non-isocyanate polyurethane prepolymer by reacting a cyclic carbonate component, a tertiary amine functional component, and, optionally, a primary amine functional component, to form an amine-terminated non-isocyanate poly-urethane prepolymer;
   neutralizing the prepolymer; and
   dispersing the neutralized prepolymer in water to form a waterborne amine-terminated non-isocyanate polyurethane.

6. The method of claim 1, wherein the waterborne non-isocyanate polyurethane epoxy hybrid coating composition is devoid of blowing agents.

7. A method for preparing waterborne non-isocyanate polyurethane epoxy hybrid coating, the method comprising:
   combining a waterborne non-isocyanate amine-terminated polyurethane polymer and a waterborne epoxy chain extender to form a waterborne non-isocyanate polyurethane epoxy hybrid coating composition;
   casting the coating composition onto a substrate to form a wet film; and
   curing the wet film to form a coating, wherein said coating has a thickness of 20 to 100 μm.

8. The method of claim 7, wherein the step of combining a waterborne non-isocyanate amine-terminated polyurethane polymer and a waterborne epoxy chain extender to form a waterborne non-isocyanate polyurethane epoxy hybrid coating composition is performed at room temperature.

9. A method for preparing waterborne non-isocyanate polyurethane epoxy hybrid coating composition, the method comprising:
   combining a waterborne non-isocyanate amine-terminated polyurethane polymer and a waterborne epoxy chain extender to form a waterborne non-isocyanate polyurethane epoxy hybrid coating composition; and
   wherein the waterborne chain extender is prepared by reacting an epoxide monomer and an amine.

10. T method of claim 9, wherein the amine is a diamine.

11. The method of claim 9, wherein the epoxide monomer is trimethylolpropane triglycidyl ether.

12. A method for preparing waterborne non-isocyanate polyurethane epoxy hybrid coating composition, the method comprising:
   combining a waterborne non-isocyanate amine-terminated polyurethane polymer and a waterborne epoxy chain extender to form a waterborne non-isocyanate polyurethane epoxy hybrid coating composition; and
   wherein the waterborne amine-terminated non-isocyanate polyurethane polymer is prepared by a method comprising:
   preparing an amine-terminated non-isocyanate polyurethane prepolymer by reacting a cyclic carbonate component, a tertiary amine functional component, and, optionally, a primary amine functional component, to form an amine-terminated non-isocyanate polyurethane prepolymer;
   neutralizing the prepolymer; and
   dispersing the neutralized prepolymer in water to form a waterborne amine-terminated non-isocyanate polyurethane.

* * * * *